US006903039B2

(12) United States Patent
Nair et al.

(10) Patent No.: US 6,903,039 B2
(45) Date of Patent: Jun. 7, 2005

(54) METHODS FOR MAKING MICROPOROUS CERAMIC MATERIALS

(75) Inventors: Balagopal N. Nair, Nagoya (JP); Yasunori Ando, Nagoya (JP); Hisatomi Taguchi, Nagoya (JP); Shigeo Nagaya, Nagoya (JP); Kiyoshi Komura, Nagoya (JP)

(73) Assignees: Noritake Co., Limited, Nagoya (JP); Chubu Electric Power Co., Inc., Nagoya (JP)

( * ) Notice: Subject to any disclaimer, the term of this patent is extended or adjusted under 35 U.S.C. 154(b) by 73 days.

(21) Appl. No.: 10/367,713

(22) Filed: Feb. 19, 2003

(65) Prior Publication Data

US 2004/0009865 A1 Jan. 15, 2004

(30) Foreign Application Priority Data

Feb. 20, 2002 (JP) ...................................... 2002-043194

(51) Int. Cl.[7] .............................................. C04B 38/00
(52) U.S. Cl. ...................... 501/80; 501/96.2; 106/122; 106/287.1; 106/287.11; 528/10; 528/38; 427/226; 427/228; 427/245; 264/43
(58) Field of Search .............................. 106/122, 287.1, 106/287.11; 501/80, 96.2; 528/10, 38; 427/226, 228, 245; 264/43

(56) References Cited

U.S. PATENT DOCUMENTS

| 4,640,901 A | * | 2/1987 | Lee et al. ..................... 501/81 |
| 5,487,774 A | | 1/1996 | Peterson et al. |
| 5,563,212 A | | 10/1996 | Dismukes et al. |
| 5,643,987 A | | 7/1997 | Dismukes et al. |
| 5,696,217 A | | 12/1997 | Dismukes et al. |
| 5,872,070 A | | 2/1999 | Dismukes et al. |
| 5,902,759 A | | 5/1999 | Dismukes et al. |
| 2002/0014298 A1 | | 2/2002 | Mase et al. |

FOREIGN PATENT DOCUMENTS

| JP | WO 97/24296 | 7/1997 |
| JP | WO 97/24297 | 7/1997 |
| JP | A 2001-247385 | 9/2001 |

* cited by examiner

*Primary Examiner*—David Brunsman
(74) *Attorney, Agent, or Firm*—Oliff & Berridge, PLC

(57) ABSTRACT

The present invention provides a method for making a microporous ceramic material and includes the steps of (a) preparing a starting material for firing comprising a nonoxide ceramic precursor containing silicon as an essential component; (b) heating the starting material for firing in an atmosphere containing at least 1 mol % of hydrogen so as to form microporous ceramic product; and (c) cooling the microporous ceramic product.

10 Claims, 3 Drawing Sheets

METHODS FOR MAKING MICROPOROUS CERAMIC MATERIALS

This application claims priority to Japanese Patent Application No. 2002-043194, filed Feb. 20, 2002, the contents of which are incorporated herein by reference.

BACKGROUND OF THE INVENTION

1. Field of the Invention

The present invention relates to microporous ceramic materials and methods for making the same.

2. Description of the Related Art

Various microporous ceramic materials are used as a gas separating material for separating a desired component (gas molecules), from a mixture of gases, a filter for purifying a liquid or a gas, or a support, onto which a catalyst or other functional compounds are fixed. In particular, ceramic materials having a large number of micropores that are so small as to have an average pore size in the order of nm, are required for use in gas separation and high performance filtration such as molecular sieves. Conventionally, siliceous materials were used as microporous ceramic materials that can meet such a requirement. For example, Japanese Laid-Open Patent Publication No.10-85568 discloses a microporous silica membrane having an average pore size of about 1 nm, a high gas permeability rate and gas selective permeability.

When using a microporous ceramic material as a gas separating material (e.g., gas separating membrane) or a filtration device, a high level of heat resistance (thermal strength), is required depending on the state where it is used. For example, a ceramic material for hydrogen separation which has high hydrogen separation properties at high temperatures (e.g., 400° C. or higher, preferably 600° C. or higher), that are as high as at room temperature is desired as a ceramic material for hydrogen separation (hydrogen separating membrane), that can separate selectively hydrogen from a mixed gas containing hydrogen. However, the microporous ceramic material made of silica is not suitable for use at such high temperatures. A microporous membrane made of silica is disadvantageous in that pores tend to disappear at high temperatures of 600° C. or higher and that this microporous membrane tends to be degraded by moisture when it is used in steam reforming.

Microporous nonoxide ceramics containing Si—C bonds, Si—N bonds and the like have been under development as a preferable material for use under high temperature conditions. For example, Japanese Laid-Open Patent Publication Nos. 8-104580 (U.S. Pat. No. 5,643,987), 8-165177 (U.S. Pat. No. 5,563,212), 10-500655 (U.S. Pat. No. 5,696,217) and 2000-507198 (U.S. Pat. No. 5,872,070) disclose nonoxide microporous ceramic materials that can be used at a relatively high temperature (400 to 500° C.). There is a demand for microporous ceramic materials that can perform gas separation or high performance filtration efficiently at temperatures (e.g., 600 to 700° C.) higher than that for the conventional microporous ceramic materials disclosed in the above-mentioned publications.

SUMMARY OF THE INVENTION

It is, accordingly, one object of the present invention to provide microporous ceramic materials that can maintain a microporous structure even at a high temperature (typically, about 400 to about 800° C., for example, about 600 to about 700° C.). It is another object of the present invention to provide methods for making the microporous ceramic materials.

The present invention provides a method that can preferably make microporous ceramic materials having a large number of micropores and a high heat resistance. This method includes (a) preparing a starting material for firing, comprised of a nonoxide ceramic precursor containing silicon as an essential component; (b) heating the starting material in an atmosphere containing at least 1 mol % of hydrogen gas (typically in an atmosphere containing hydrogen gas and nitrogen or inert gas) so as to form a microporous ceramic product; (c) cooling the microporous ceramic product.

Microporous ceramics having a large surface area per unit weight and having a large number of micropores (herein, "micro pores" refer to open pores generally having a pore size (diameter) of less than 2 nm, which also applies to the following), can be stably obtained by firing the starting material (involving pyrolysis of a ceramic precursor) in the presence of hydrogen gas, which is a reactive gas. According to the method of the present invention, microporous ceramic materials having excellent structural stability at a high temperature of 400° C. or more (e.g., in the range of about 400° C. to about 800° C., in particular, from about 600° C. to about 700° C.), can be produced.

Preferably, in step (b), the starting material is heated to a maximum firing temperature at a heating rate of 10° C./min or less. According to the firing process in which the heating rate is controlled in this manner, so-called mesopores (which refer to pores having a pore size larger than 2 nm and up to about 50 nm), and pores larger than the mesopores can be suppressed from being formed, so that microporous ceramic materials having a large number of micropores and a large surface area can be produced.

More preferable, in step (b), the maximum firing temperature is set in the range of about 400° C. to about 1000° C. In particular, it is preferable that the maximum firing temperature is in the range of about 600° C. to about 800° C. (preferably, in the range of about 600° C. to about 700° C., e.g., 650° C.±20° C.). In a more preferable method, the starting material is heated to an intermediate temperature (e.g., in the range of about 200° C. to about 400° C.), that is before reaching the preset maximum firing temperature and then is stored in that range for at least one hour. For example, it is preferable to keep the starting material at a temperature in the range of about 200° C. to about 300° C. for 3 to 12 hours. According to this firing process, micropore-rich and homogenous microporous ceramic material scan be produced.

In another preferable method, the formed microporous ceramic product is cooled from the maximum firing temperature to 100° C. or lower (typically room temperature), at a cooling rate of about 20° C./min or less. Preferably, the cooling rate may range from 1° C./min to 2° C./min. According to such a controlled cooling process, microporous ceramic materials having a micropore structure without defects observed in a wide range can be produced.

Preferably, various polysilazanes or pre-ceramic polymers similar to polysilazane (i.e., polymers containing structural units having Si—N bond linkages), are used as the nonoxide ceramic precursor. When a polysilazane (organic polysilazane or inorganic polysilazane), or a similar pre-ceramic polymer is used as the precursor, microporous ceramics having thermally stable Si—N bond linkages as the basic backbone can be formed easily. Therefore, microporous ceramic materials that have excellent thermal shock resistance and are suitable for gas separation and high performance filtration (molecular sieve), can be produced.

One of the microporous ceramic products provided by the methods taught herein contains structural units having Si—N bond linkages. Typically, according to the $N_2$ adsorption method, the microporous ceramic product has the peak value of the pore size distribution or the average pore size (diameter), of less than 2 nm.

In one representative embodiment, even if the maximum firing temperature is 600° C. to 700° C. (preferably 650° C. to 700° C.) or higher, microporous ceramic products having a surface area of 50 $m^2/g$ or more (preferably 100 $m^2/g$ or more, more preferably 300 $m^2/g$ or more, typically 300 to 500 $m^2/g$), can be obtained. Furthermore, the volume of micropores of the obtained microporous ceramic product (hereinafter, referred to as "pore volume"), can be 0.08 $cm^3/g$ or more, preferably 0.1 $cm^3/g$ or more (e.g., 0.15 to 0.3 $cm^3/g$). The microporous ceramic product having such a microporous structure can be used preferably for gas separation treatment or high performance filtration treatment (e.g., molecular sieves), or as a catalyst support at a high temperature (in the vicinity of the maximum firing temperature).

One of the preferable microporous ceramic products (materials), taught herein is suitable for use at 600° C. to 700° C., and the surface area thereof can be 350$m^2/g$ or more (preferably 400 $m^2/g$ or more). The peak value of the pore size distribution or the average pore size can be in the range of about 0.2 nm to about 2 nm, and the pore volume can be 0.15 $cm^3/g$ or more.

According to another aspect, the present invention provides microporous ceramic materials having a layered porous structure (hereinafter, referred to as "layered ceramic materials"). The layered ceramic materials taught herein have a film-like microporous ceramic layer and a ceramic support for supporting the ceramic layer. Typically, the film-like ceramic layer is substantially comprised of Si—N bond linkages. Preferably, the peak value of the pore size distribution or the average pore size of the film-like ceramic layer can be 0.2 to 2 nm. More preferably, the pore volume of the film-like ceramic layer is greater than 0.05 $cm^3/g$ (even more preferably 0.1 $cm^3/g$ or more). The layered ceramic materials having this feature can stably maintain the micropore structure even at a high temperature in excess of 400° C. (typically 600° C. to 700° C.). Therefore, the layered ceramic materials are suitable for gas separation treatment or high performance treatment (e.g., molecular sieves), at high temperatures.

DETAILED DESCRIPTION OF THE INVENTION

Figure 1:
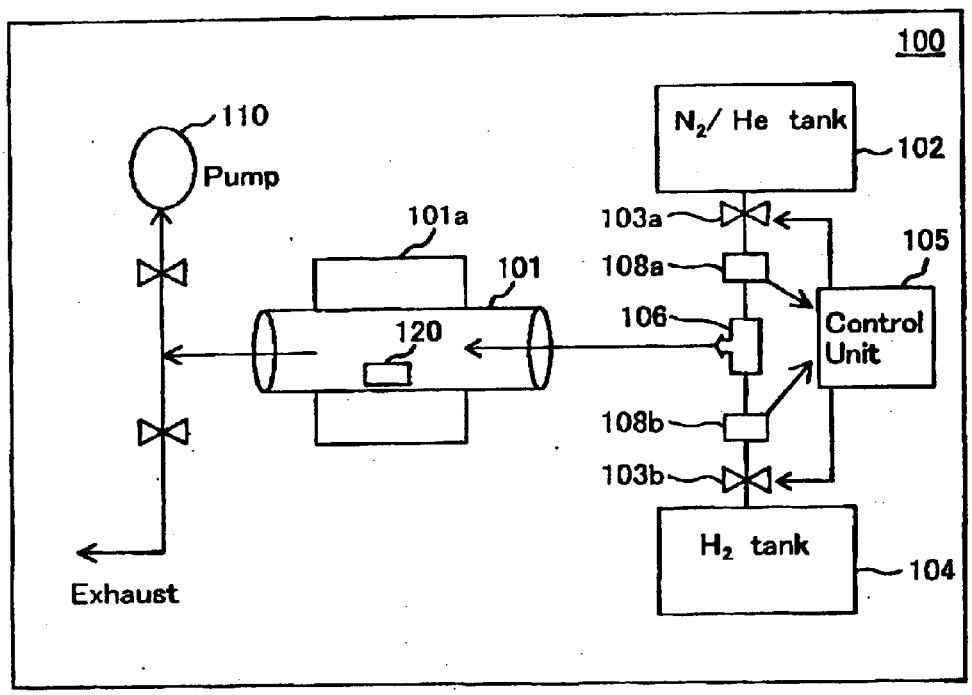
FIG. 1 shows a schematic block diagram of an apparatus for practicing the method of the present invention.

The technical matters, other than the contents specifically referred to in this specification that are necessary in order to practice the present invention can be considered as a matter of design choice to those skilled in the art based on conventional techniques. The present invention can be practiced based on the technical contents disclosed by this specification, the drawings and by technical common knowledge of the art.

In the present invention, a microporous ceramic material is produced by firing a starting material for firing including a silicon-based nonoxide ceramic precursor as a main component in an atmosphere containing at least 1 mol % of hydrogen gas. Herein, a "silicon-based nonoxide ceramic precursor" refers to an inorganic or organic compound (polymer), containing Si as a primary element and can form nonoxide ceramic by thermal decomposition (pyrolysis), at a high temperature (e.g., 400° C. to 800° C.) (hereinafter, referred to as silicon ceramic precursor). Typically, the nonoxide ceramics formed from such a precursor contain structural units having Si-based bond linkages such as Si—N bonds, Si—C bonds, Si—Si bonds, Si—C—N bonds, and Si—N—B bonds.

For the silicon ceramic precursor contained in the starting material for firing, only one type can be used or an appropriate combination of two or more types of the precursors can be used. Preferably, the silicon ceramic precursor to be used is selected such that the basic structure (principal chain), of the ceramic product is constituted with repeated Si—N bonds. Alternatively, the silicon ceramic precursor to be used can be selected such that ceramics can be formed in which Si—C bonds, Si—O bonds, Si—H bonds or the like are partially added to such a principal chain made of Si—N bonds.

Preferably, the type, or the abundance ratio, of the silicon ceramic precursor to be used is adjusted so that the number of Si atoms that form Si—N bonds with respect to the number of Si atoms present in the ceramic product formed by thermally decomposing the precursor is 10% or more (preferably 20% or more). When this formation ratio of Si—N bonds is less than 10%, the heat resistance or the chemical stability under conditions containing high temperatures is decreased, and therefore it is not preferable. In particular, the obtained ceramic product may not be suitable for use at high temperatures and in an atmosphere containing water vapor.

Preferably, various polysilazane, polycarbosilazane, polycarbosilane, polyorganosiloxane, polysilastyrene or the like can be used as the silicon ceramic precursor. A particularly preferable precursor is polysilazane represented by the following general formula. Typically, $R_1$, $R_2$, and $R_3$ are each independently hydrogen or an aliphatic or aromatic hydrocarbon group having 1 to 10 carbon atoms.

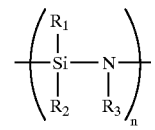

Polysilazane preferably used to produce a microporous ceramic material can be prepared in the following manner. Silazane oligomers are obtained by reacting dihalosilane ($R^1SiHX_2$) or a mixture of the dihalosilane and other dihalosilane ($R^2R^3SiX_2$) with ammonia. Then, a dehydrogenation reaction is effected in the silazane oligomers in the presence of a basic catalyst. Thus, dehydrogenation is caused in nitrogen atoms adjacent to silicon atoms. As a result, the silazane oligomers are mutually crosslinked by dehydrogenation so as to form polysilazane. Preferable dihalosilane used in this forming process is as follows: $R^1$, $R^2$ and $R^3$ are each independently either one of hydrogen, a lower alkyl group having 1 to 6 carbon atoms, a substituted allyl group, a non-substituted allyl group, a non-substituted aryl group having 6 to 10 carbon atoms, a trialkylamino group, and a dialkylamino group. Alternatively, $R^1$ is hydrogen, $R^2$ and $R^3$ are each independently either one of the above-listed functional groups. In this case, $R^1$, $R^2$ and $R^3$ can be the same group or a different group from each other. X in the formula of dihalosilane is a halogen group.

Alternatively, commercially available polysilazane (e.g., available from Chisso Corporation in Japan) is the preferable choice. A microporous ceramic material having a high heat resistance (i.e., having a large number of micropores but a very small number of pores with a pore size equal to or larger than a mesopore), and having a structure of repeated Si—N bonds can be formed easily by thermally decomposing polysilazane.

There is no particular limitation regarding the molecular weight of the silicon ceramic precursor to be used, but those having an average molecular weight of about 200 to 100,000 are preferable in terms of viscosity control. Silicon ceramic precursors having an average molecular weight of about 1,000 to 20,000 are particularly preferable.

As for the starting materials used for firing in the production method of the present invention, any starting materials can be used, as long as they contain the silicon ceramic precursor as the main component, and there is no particular limitation regarding its form. The form of the starting materials can differ as appropriate, depending on the characteristics of the silicon ceramic precursor to be used. For example, the starting materials may be constituted substantially only by melted silicon ceramic precursors. Typically, the starting materials can be prepared in a form in which the silicon ceramic precursor is dissolved or dispersed in an appropriate solvent. For example, various organic solvents can be used as the solvent in which polysilazane is dissolved. Aromatic solvents such as benzene, toluene, and xylene and ether-based solvents such as dioxane, tetrahydrofuran, and dibutyl ether are appropriate. There is no particular limitation regarding the concentration of polysilazane in the solution, but an appropriate concentration is about 10 mass % to 80 mass % of the entire solution, when producing granular or flake-like microporous ceramic materials, and the concentration is preferably about 20 mass % to 70 mass %. An appropriate concentration of polysilazane in the solution is about 0.5 mass % to 40 mass %, when forming a coating film made of polysilazane on the surface of a support by dip coating as described below, and the concentration is preferably about 1 mass % to 25 mass % of the entire solution.

In order to obtain a microporous ceramic material having a desired shape, the starting material is formed into an intended shape before thermal decomposition. Typically, the starting material is formed into a granular or film-like shape (in this case, it is typically formed on the surface of a ceramic support), but other shapes such as sheet-like, plate-like, tubular or other three-dimensional shapes can be used, depending on the application For example, when applying the microporous ceramic material produced according to the method taught herein to a reactor as a module for gas separation, a film-like (provided in a support), tubular, monolithic, honeycomb, polygonal flat plate-like shapes can be used. The formation can be performed by appropriate conventional approaches that have been commonly used in the art.

For example, known techniques such as extrusion molding, casting, tape casting, and cold isostatic press (CIP) molding can be used. Furthermore, the microporous ceramic material can be formed into a fiber-like shape by using melted silicon ceramic precursors or a starting material for firing that is prepared into a paste or slurry and an appropriate extruder or a spinning apparatus. The microporous ceramic material can be formed into a film-like shape by attaching the starting material for firing onto the surface of an appropriate microporous support by dip coating or the like.

Then, the starting material for firing that has been formed into granular, flake-like or other desired shapes is fired (thermally decomposed). In the present teaching, the silicon ceramic precursor and a ceramic product formed from the precursor are placed in the presence of hydrogen gas ($H_2$), during a firing treatment (a period from heating for thermal decomposition to cooling ends of the formed ceramics after the thermal decomposition), or at least until the start of cooling after heating to the maximum firing temperature. The concentration of the hydrogen gas in the atmosphere (typically non-oxidative atmosphere), in this process is at least 1 mol %, typically 5 mol % or more (5 to 10 mol %). The concentration is preferably 1 mol % or more, and particularly preferable 20 mol % or more. A microporous ceramic material having a sufficient surface area and a large number of micropores can be formed by firing the precursor in the atmosphere containing about 10 to 60 mol % of hydrogen gas.

It is preferable to use an inert gas (including nitrogen), as a gas component other than the hydrogen gas in the atmosphere in which the firing treatment is performed. For example, nitrogen ($N_2$) neon (Ne), helium (He), or argon (Ar) can be used. For example, it is preferable to fire the silicon ceramic precursor such as polysilazane in a mixed gas (non-oxidative atmosphere), containing 5 to 50 mol % of hydrogen gas and 50 to 95 mol % of inert gas such as nitrogen or helium. A mixed gas containing 15 to 50 mol % of hydrogen gas and 50 to 85 mol % of inert gas is more preferable.

In firing involving thermal decomposition of the silicon ceramic precursor performed in the presence of a hydrogen gas, it is preferable to set the maximum firing temperature generally in the range of 400° C. to 800° C. When using various polysilazanes as the ceramic precursor, it is preferable to set the maximum firing in the range of 600° C. to 300° C. (preferably 600° C. to 700° C., e.g., 650±20° C.). When the maximum firing temperature is in such a range, a microporous ceramic material having a high heat resistance and a large number of micropores (i.e., a large pore volume), can be formed. This microporous ceramic material is used preferably as a gas separation material, a filtration material or a catalyst support that are used in the vicinity of the maximum firing temperature described above (e.g., 650 to 700° C.).

The thermal decomposition (pyrolysis), of the silicon ceramic precursor is performed by gradually heating the precursor in an atmosphere containing hydrogen gas, preferably at a constant beating rate (typically 10° C./min or less). The heating rate is preferably about 0.5° C. to 3.0° C./min, more preferable 1° C. to 2° C./min (a slight discrepancy is allowable). When the heating rate is too high, the growth of mesopores is facilitated, so that this is not preferable. On the other hand, when the heating rate is too low, the firing process takes too much time and thus is not efficient.

In the middle of heating the ceramic precursor at the heating rate as described above, it is preferable to keep the precursor at an intermediate temperature before reaching the maximum firing temperature temporarily. This process makes it possible to stably produce a ceramic material that is uniformly rich in micropores throughout the material. For example, when heating the precursor from room temperature to a maximum firing temperature of about 650° C. at a heating rate of about 1° C./min, the precursor is stored at an intermediate temperature set between 200° C. and 400 ° C. (250° C. ±25° C. is particularly preferable in the case of polysilazane), for at least one hour (preferably 3 to 12 hours, and particularly preferable 8 to 12 hours). This firing process makes it possible to produce a micropore-rich ceramic material that is homogenous throughout the material. The process of storing the precursor at an intermediate temperature is not necessarily performed once in the firing process, but it can be performed two or three times or more. For example, when the maximum firing temperature is set to 800° C., the precursor may be heated from room temperature to a temperature of 250° C. at a heating rate of about 1° C./min, and stored at that temperature for about three hours. Then, the precursor may be heated to a temperature of 500° C. at a heating rate of about 1° C./min, and stored at that temperature for about three hours Thereafter, the precursor may be heated to the maximum firing temperature at the same heating rate.

After the temperature has reached the maximum firing temperature, the resultant product (i.e., a thermally decomposed ceramic product formed from the precursor having a predetermine shape), is stored at that temperature region (typically the maximum firing temperature±25° C.). This can facilitate mild diffusion of the ceramic produced as a result of the thermal decomposition. The thermally decomposed product is stored preferably for 0.5 to 5 hours (typically 1 to 2 hours). After storing it in the maximum firing temperature region for a predetermined time, the ceramic product is cooled to 100° C. or less, typically room temperature (5° C. to 35° C.). In order to obtain a microporous ceramic material in which substantially no defect is observed, it is preferable to cool the ceramic product gradually. For example, a cooling rate of about 20° C./min is appropriate, and a cooling rate of about 1° C. to 2° C./min (a slight discrepancy is allowable), is preferable.

A preferable embodiment of production of a microporous ceramic material will be described with reference to the accompanying drawings.

A apparatus 100, shown in FIG. 1, is provided with a cylindrical heating furnace (muffle furnace), 101 for firing, and a mixed gas that contains hydrogen gas and inter gas is supplied continuously to the furnace at a predetermined flow rate (flow speed) (see the arrow in FIG. 1). An inert gas source ($N_2$ tank or He tank in this embodiment), 102 and a hydrogen gas source ($H_2$ tank in this embodiment), 104 are connected to the heating furnace 101 on the gas introduction side via a mixing valve 106. Magnetic valves 103a, 103b and flow meters 108a, 108b are connected to these gas sources 102, 104, respectively. The magnetic valves 103a, 103b and flow meters 108a, 108b are electrically connected to a control unit 105. On the other hand, the pump 110 electrically connected to the control unit 105 is connected to the heating furnace 101 on the gas exhaust side.

In the apparatus 100 having this structure, the control unit 105 is operated so that the flow rate of the gas from each of the gas sources, 102, 104 is adjusted (i.e., opening and closing of the magnetic valve 103a, 103b are controlled), based on the input data from the flow meters 108a, 108b, and thus the mixed gas having a predetermined mole ratio and flow rate (flow speed), can be introduced into the heating furnace 101. The control unit 105 is also electrically connected to a heater, 101a (typically, a gas combustion apparatus), provided in the heating furnace 101, and the temperature in the furnace can be adjusted appropriately by controlling the heater 101a to be either on or off based on the operation signals from the control unit 105.

An example of a method for producing a granular microporous ceramic material using the above-described production apparatus 100 will be described below. A starting material 120 prepared by dissolving or dispersing polysilazane or another silicon ceramic precursor in an appropriate solvent (toluene or the like), is stored in the heating furnace 101. The pump 110 is operated during a firing treatment (thermal decomposition treatment), so that the mixed gas containing hydrogen (e.g., 50 mol % of $H_2$ and 50 mol % of $N_2$), is continuously supplied to the furnace at a predetermined flow rate (typically 5 to 1000 ml/min).

The heater 101a is operated based on the operation signals from the control unit 105 to control the extent of the heating. For example, the temperature in the heating furnace 101 is increased from room temperature to 250° C. at a ratio of about 1° C./min, and then is kept at that temperature for 3 to 10 hours. Then, the temperature in the heating furnace 101 is increased to the maximum firing temperature (e.g., 650° C. to 700° C.), at a rate of about 1° C./min so that the ceramic precursor 120 is thermally decomposed. Preferably, the furnace is kept at the maximum firing temperature for 1 to 2 hours. Then, the furnace is cooled gradually at a rate of about 1° C./min. The furnace is cooled at this cooling rate until the temperature in the furnace reaches 100° C. or less (typically room temperature). The firing process is performed in this manner and thus a granular microporous ceramic material having an average size or a peak value in the pore size distribution measured by low-temperature gas adsorption-desorption (similar to BET method such as a general nitrogen or argon ($N_2$/Ar) adsorption method), of 2 nm or less (preferably 0.5 to 1 nm), a surface area of 350 $m^2/g$ or more (preferably 400 $m^2/g$ or more), and a pore volume of 0.15 $cm^3/g$ or more can be obtained.

Next, a preferable production example of a layered ceramic material in which a microporous film is formed in a layered form on a surface of a microporous support will be described below. The layered ceramic material produced by the method taught herein has a film-like microporous ceramic layer made of a thermally decomposed product of the silicon ceramic precursor and, a ceramic support which supports the film-like microporous ceramic layer, and further, can have another layer as long as it does not impair the heat resistance or the thermal shock resistance. For example, another microporous film layer can be formed between the ceramic layer and the microporous ceramic support. The gas separation capability can be improved by forming multiple layers without such a film layer permeating into the support. For example, the permeability coefficient (ratio) of hydrogen/nitrogen can be 15 or more.

There is no particular limitation regarding the pore size of the ceramic support, as long as it does not affect the gas separation and the filtration properties. However, it is appropriate that the ceramic support has a pore size larger than the average pore size in the film-like ceramic layer. A porous substance having a peak value of the pore size distribution and/or an average pore size of about 0.01 μm to 10 μm is preferable as the support. The porosity is appropriately 30% to 60%, and preferably 35% to 50%.

There is no particular limitation regarding the thickness of the support (supporting layer), in the produced layered ceramic material, as long as it can support the film-like ceramic layer while maintaining a predetermined mechanical strength. For example, when the thickness of the film-like microporous ceramic layer is 0.5 $\mu$m to 5 $\mu$m, the thickness of the ceramic support is preferably about 100 $\mu$m to 10 mm. The mechanical strength of the support is changed depending on the shape, and the requirement for the mechanical strength is varied depending on the application, so that there is no particular limitation However, it is preferable to set the average pore size or the porosity of the support such that the support has a mechanical strength of 30 MPa or more (more preferably 60 MPa and even more preferably 90 MPa), in 3-point bending strength (according to 3-point bending test of JIS R1601), at 600° C. to 800° C.

There is no particular limitation regarding the material or the shape (which defines the shape of the entire layered product), of the support, as long as it can maintain a desired mechanical strength. For example, various shapes can be used, depending on the application. For example, a thin plate-like, a tubular, monolithic, honeycomb, polygonal flat plate-like, and other three dimensional shapes can be used as the shape when the layered ceramic material is applied to a reactor such as a reformer as a module for gas separation. These shapes can be obtained by known techniques such as extrusion molding, casting, tape casting, and CIP molding.

A preferable layered ceramic material can be obtained by forming a microporous film made of polysilazane on the surface of a microporous support made of silicon nitride. With this combination, both the support and the film on the surface of the support are substantially constituted by a structure having repeated Si—N bonds (i.e., silazane). The microporous structure can be stably maintained even at a high temperature of more than 600° C. Furthermore, there is no significant difference in the thermal shrinkage ratio (thermal expansion ratio) between the support and the film, so that high thermal shock resistance can be achieved. In other words, even if the layered ceramic material is exposed to a rapid temperature change, the incidence of thermal peeling or cracks of the film-like microporous ceramic layer can be reduced significantly. The layered ceramic material, having such a high heat resistance and thermal shock resistance is suitable for gas separation treatment or high performance filtration treatment (e.g., molecular sieves), at high temperatures or under conditions in which the temperature in the environment of use is varied significantly.

There is no particular limitation regarding the thickness, but it is appropriate that the thickness of the ceramic film is 100 $\mu$m or less when it is used for gas separation (preferably 0.01 $\mu$m to 50 $\mu$m and most preferable 0.05 $\mu$m to 50 $\mu$m).

A film having a thickness that achieves a hydrogen/nitrogen separation factor of at least 2 (preferably 2.5 or more), at 400° C. (preferably 600° C., more preferable 800° C.), and a hydrogen permeability of at least $1\times10^{-10}$ mol/m$^2$·s·Pa (more preferable 1 $\times10^{-7}$ mol/m$^2$·s·Pa or more), at that temperature is preferable as a film used to separate hydrogen gas from a reformed gas or other mixed gas. The microporous ceramic film having such properties makes it possible to perform a hydrogen separation treatment efficiently while maintaining a relatively high hydrogen permeability rate and hydrogen separation capability (hydrogen selectivity), under the conditions of high temperatures and corrosion environments.

A hydrogen separating membrane having a hydrogen/nitrogen separation factor of 3.0 or more (typically in the range from 3.0 to 200,000), at 600° C., and a hydrogen permeability of $1\times10^{-10}$ mol/m$^2$·s·Pa or more (typically in the range from $1\times10^{-8}$ to $1\times10^{-5}$ mol/m$^2$·s·Pa), at that temperature is particularly preferable. A hydrogen separating membrane having a hydrogen/nitrogen separation factor of 3.0 or more (typically in the range from 3.0 to 200,000), at any temperature in the range from 20° C. to 800° C., and a hydrogen permeability of $1\times10^{-10}$ mol/m$^2$·s·Pa or more (typically in the range from $1\times10^{-8}$ to $1\times10^{-5}$ mol/m$^2$·s·Pa), in that temperature range is even more preferable. The present invention makes it possible to provide a hydrogen separating membrane that satisfies these requirements.

Herein, "hydrogen/nitrogen separating factor", refers to the ratio of the hydrogen permeability and the nitrogen permeability under the same condition, that is, the ratio (mole ratio), of the amount of permeated hydrogen gas to the amount of permeated nitrogen gas under the same condition. Herein, "hydrogen permeability (mol/m$^2$·s·Pa)" and "nitrogen permeability (mol/m$^2$·s·Pa)" are represented by the amount (mol) of permeated hydrogen gas and the amount (mol) of permeated nitrogen gas per unit of time (one second) and the unit film surface area (1 m$^2$) when the differential pressure (a difference between the pressure on the gas supply side and the pressure on the gas permeation side with the microporous ceramic film interposed therebetween) is 1 Pa, respectively.

In order to form a coating film made of polysilazane or other silicon ceramic precursor on a surface of a porous ceramic support made of silicon nitride, alumina or the like, various methods used in conventional processes for forming a thin film can be used. For example, dip coating, spin coating, screen printing, spraying or other similar methods can be used. In particular, dip coating makes it possible to suppress a solution containing the silicon ceramic precursor (starting material for firing) from permeating into the internal portion of the microporous ceramic support, and to suppress destruction of a microstructure due to gas generation caused by thermal decomposition, capillary pressure, firing shrinkage or the like. Therefore, the dip coating is a preferable method for forming a microporous ceramic layer having no defects directly on the surface of a support.

After the coating film made of the silicon ceramic precursor is formed an the surface of the support in this manner and then dried (typically in an atmosphere of air, nitrogen gas or hydrogen gas), for example, the support provided with the coating is placed in the heating furnace 101 of the apparatus 100 as described above. Then, the support provided with the coating is fired according to the firing process as described above, and thus a micropore-rich ceramic film can be formed. For example, a ceramic support made of alumina, silicon nitrogen or the like, having an average pore size (diameter) of about 100 nm is dipped (immersed), in a dispersion or a solution (starting material for firing), containing polysilazane in a concentration of 1 to 25 mass % and toluene for the remaining part of the solution. The process duration for such dip coating can be about several seconds to about one minute, and preferably about 5 to 30 seconds. The support that has been subjected to the dipping treatment is dried, and then subjected to a firing (thermal decomposition) treatment based on the firing process as described above in the presence of hydrogen gas. The above-described production apparatus 100 can preferably be used.

The present invention will now be described more specifically by way of several examples, but the present invention is not limited thereto.

EXAMPLE 1

A granular Microporous Ceramic Material (1)

A granular microporous ceramic material (silicon nitride) was made using a commercially available slurry containing polysilazane ("NCP201" manufactured by Chisso Corporation, 60 mass % of polysilazane, 40 mass % of toluene, the number average molecular weight of polysilazane is 1300). The polysilazane-containing slurry put in an alumina container was placed in the beating furnace 101 of the production apparatus 100 as shown in FIG. 1, and was stored at room temperature for 30 minutes. After the polysilazane-containing slurry was placed in the furnace, a mixed gas containing 5 mol % of $H_2$ and 95 mol % of $N_2$ was continuously supplied to the heating furnace 101 at a flow rate of 100 ml/min until the firing process described below was completed. Then, the polysilazane-containing slurry was subjected to a heat treatment (firing treatment) in the furnace according to the following schedule to evaporate the toluene and thermally decompose the polysilazane. The heat treatment was performed by (1) heating the slurry from room temperature to 250° C. at a heating rate of 1° C./min; (2) storing it at 250° C. for 10 hours; (3) heating it from 250° C. to 650° C. at a heating rate of 1° C./min; (4) storing it at 650° C. (maximum firing temperature) for one hour; and (5) cooling it from 650° C. to room temperature at a temperature decrease rate of 1° C./min. Thus, a micropore-rich granular microporous ceramic material (Si—N based, silicon nitride) was made.

EXAMPLE 2

A Granular Microporous Ceramic Material (2)

A granular microporous ceramic material (silicon nitride) was made using the same starting material for firing and production apparatus as those of Example 1. However, the firing schedule was as follows: (1) heating the slurry from room temperature to 250° C. at a heating rate of 1° C./min; (2) storing it at 250° C. for 3 hours; (3) heating it from 250° C. to 700° C. at a heating rate of 1° C./min; (4) storing it at 700° C. (maximum firing temperature) for one hour; and (5) cooling it from 700° C. to room temperature at a temperature decrease rate of 1° C./min. Thus, a micropore-rich granular microporous ceramic material (silicon nitride) was made.

EXAMPLE 3

A Granular Microporous Ceramic Material (3)

A granular microporous ceramic material (silicon nitride) was made using the same starting material and apparatus as those of Example 1. However, the composition of the mixed gas supplied to the furnace was such that $H_2$ was 6 mol % and $N_2$ was 94 mol %. The firing schedule was the same as that of Example 1. Thus, a micropore-rich granular microporous ceramic material (silicon nitride) was made.

EXAMPLE 4

A Granular Microporous Ceramic Material (4)

A granular microporous ceramic material (silicon nitride) was made using the same starting material and apparatus as those of Example 1. However, the composition of the mixed gas supplied to the furnace was such that $H_2$ was 15 mol % and $N_2$ was 85 mol %. The firing schedule was the same as that of Example 1. Thus, a micropore-rich granular microporous ceramic material (silicon nitride) was made.

EXAMPLE 5

Production of a Granular Microporous Ceramic Material (5)

A granular microporous ceramic material (silicon nitride) was made using the same starting material and apparatus as those of Example 1. However, the composition of the mixed gas supplied to the furnace was such that $H_2$ was 20 mol % and He was 80 mol %. The firing schedule was the same as that of Example 1. Thus, a micropore-rich granular microporous ceramic material (silicon nitride) was made.

EXAMPLE 6

A Granular Microporous Ceramic Material (6)

A granular microporous ceramic material (silicon nitride) was made using the same starting material and apparatus as those of Example 1. However, the composition of the mixed gas supplied to the furnace was such that $H_2$ was 50 mol % and $N_2$ was 50 mol %. The firing schedule was as follows: (1) heating the slurry from room temperature to 250° C. at a heating rate of 1° C./min; (2) storing it at 250° C. for 10 hours; (3) heating it from 250° C. to 700° C. at a heating rate of 1° C./min; (4) storing it at 700° C. (maximum firing temperature) for one hour; and (5) cooling it from 700° C. to room temperature at a temperature decrease rate of 1° C./min. Thus, a micropore-rich granular microporous ceramic material (silicon nitride) was made.

EXAMPLE 7

A Granular Microporous Ceramic Material (7)

A granular microporous ceramic material (silicon nitride) was made using the same starting material and apparatus as those of Example 1. However, the composition of the mixed gas supplied to the furnace was such that $H_2$ was 50 mol % and $N_2$ was 50 mol %. The firing schedule was as follows: (1) heating the slurry from room temperature to 250° C. at a heating rate of 1° C./min; (2) storing it at 250° C. for 3 hours; (3) heating it from 250° C. to 650° C. at a heating rate of 1° C./min; (4) storing it at 650° C. (maximum firing temperature) for one hour; and (5) cooling it from 650° C. to room temperature at a temperature decrease rate of 1° C./min. Thus, a micropore-rich granular microporous ceramic material (silicon nitride) was made.

EXAMPLE 8

A Granular Microporous Ceramic Material (8)

A granular microporous ceramic material (silicon nitride) was made using the same starting material and apparatus as those of Example 1. However, the composition of the mixed gas supplied to the furnace was such that $H_2$ was 50 mol % and $N_2$ was 50 mol %. The firing schedule was the same as that of Example 1. Thus, a micropore-rich granular microporous ceramic material (silicon nitride) was made.

<Measurement of Surface Area, Pore Volume and Pore Size>

The surface area, the pore volume and the pore size of the granular microporous ceramic materials obtained in Examples 1 to 8 were measured as follows. After the firing treatment was performed according to the above-described schedule, 100 g of the obtained granular microporous ceramic material was transferred to an airtight container, and so-called nitrogen adsorption method was performed. More specifically, the number of moles of nitrogen that were adsorbed on the surface of the ceramic material at a liquid nitrogen temperature (about 77° K) was obtained and then the surface area (BET specific surface area) and the pore volume of the ceramic materials to be tested were calculated based on the obtained number of moles. Moreover, the pore size distribution was obtained, and the peak value thereof was calculated. Table 1 shows the results.

TABLE 1

|      | Surface area (m²/g) | Pore volume (cm³/g) | Pore size peak value (nm) |
|------|---------------------|---------------------|---------------------------|
| Ex.1 | 289.3               | 0.131               | 0.5                       |
| Ex.2 | 177.8               | 0.053               | 0.5                       |
| Ex.3 | 335.1               | 0.150               | 0.5                       |
| Ex.4 | 395.2               | 0.190               | 0.5                       |
| Ex.5 | 408.2               | 0.192               | 0.5                       |
| Ex.6 | 373.2               | 0.159               | 0.5                       |
| Ex.7 | 486.8               | 0.250               | 0.6                       |
| Ex.8 | 450.8               | 0.240               | 0.5                       |

As seen from Table 1, the granular microporous ceramic materials obtained in the examples have a peak pore size in the range of 0.5 nm to 1.0 nm, and the surface areas are large. That is to say, they have a large number of micropores. In particular, although the maximum firing temperature is as high as 650° C. to 700° C., the pore volume of all the ceramic materials except for Example 2 is not less than 0.1 cm³ /g. This indicates that these granular microporous ceramic materials have a large number of micropores, and can achieve efficient gas separation and high performance filtration at a temperature as high as 600° C. to 700° C. (typically 650° C. to 700° C.). Furthermore, this indicates that the materials can preferably be a catalyst support used under high conditions of temperatures.

As seen from Table 1, the higher the hydrogen gas concentration in the gas atmosphere is during firing, the more easily a microporous ceramic material having a large surface area and pore volume can be formed (Examples 4 to 8). A microporous ceramic material having a surface area of about 400 m² /g or more, and a pore volume of about 0.2 cm³/g or more, can be produced by firing polysilazane or other silicon ceramic precursors in an atmosphere containing at least 15 mol % of hydrogen gas.

EXAMPLE 9

Preparation of Gas Separating Membrane (Gas Separating Module)

First, 90 parts by weight of silicon nitride powder, 5 parts by weight of alumina powder, 5 parts by weight of yttria powder, and 60 parts by weight of water were fed to an alumina pot, and were stirred with balls having a diameter of 30 mm for 24 hours, so that a slurry was prepared. Then, 15 parts by weight of an organic binder of wax type, and 2 parts by weight of wax emulsion were added to the slurry, followed by mixing for 16 hours. Thereafter, spray drying was performed and thus granules were made. The obtained ceramic granules mainly composed of silicon nitride were molded into a tubular shape (outer diameter: 10 mm, inner diameter: 7mm, length: 250 mm) by cold isostatic pressing in raw processing. Then, the raw processed tube was degreased, and fired in the air at 1400° C. (maximum firing temperature). Thus, a tubular silicon nitride porous member, that is, a porous ceramic support in this example was obtained (see the element denoted by reference numeral 14 in FIG. 2). The average pore size of the obtained microporous silicon nitride member was about 60 nm (according to the mercury penetration method).

On the other hand, polysilazane powder was dissolved in toluene, and ultrasonic agitation was performed for about one hour, and thus a polysilazane solution (coating liquid) having a solid concentration of 20 mass % was prepared.

Then, the silicon nitride microporous member obtained as above was dipped in the coating solution for about 30 seconds. At this dipping treatment, the openings on both ends of the tubular silicon nitride microporous member were wrapped with a synthetic resin film so that the coating liquid was attached only to the outer circumferential surface of the tubular silicon nitride microporous member. After the dipping treatment, the silicon nitride microporous member was lifted from the coating solution at a constant speed and was dried at 60° C. Thereafter, the tubular silicon nitride microporous member provided with a polysilazane coating on its outer circumferential surface was disposed in the heating furnace 101 of the apparatus 100 shown in FIG. 1. A mixed gas containing 20 mol % of $H_2$ and 80 mol % of $N_2$ was continuously supplied to the heating furnace 101 at a flow rate of 100 ml/min. Then, the firing treatment was performed by the same firing schedule as in Example 1.

A layered ceramic material in which the microporous ceramic film is formed on the outer circumferential surface of the tubular microporous ceramic support layer made of silicon nitride was obtained by the series of treatments as described above. While measuring with a scanning electron microscope (SEM), there was no surface defect with at least a submicron size on this microporous ceramic film. When the pore size of the pores present in the microporous ceramic film was measured by a general argon adsorption method, the peak value of the pore size was about 0.5 nm. The thickness thereof was about 0.3 μm.

EXAMPLE 10

Evaluation of Gas Separating Properties of the Tubular Layered Ceramic Material (Gas Separating Module)

Figure 2:
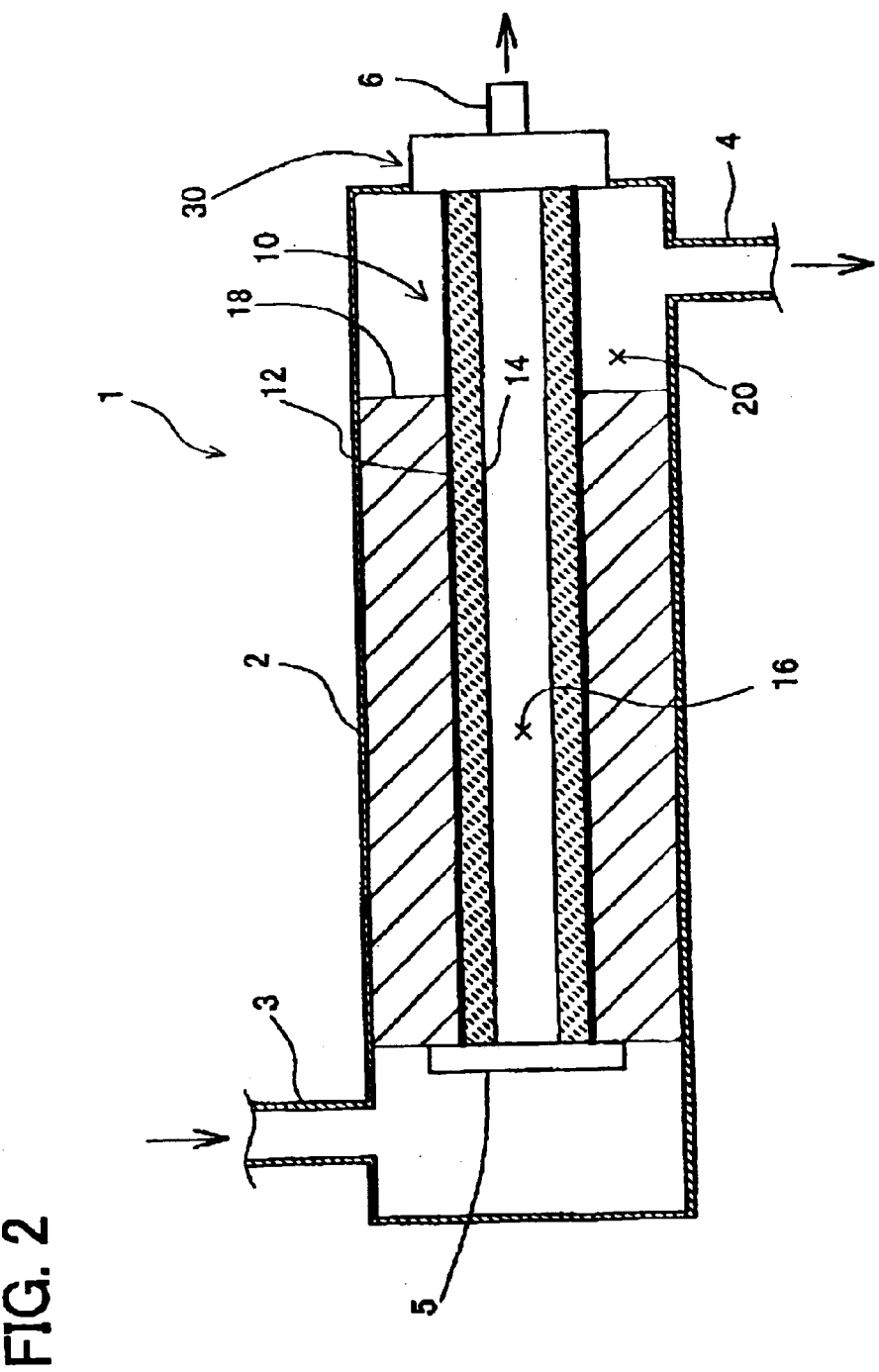
FIG. 2 shows a schematic view of the structure of a reformer having a gas separating membrane (module) of one example.

Next, a reformer 1 is produced with the tubular layered ceramic material 10 of Example 9 (hereinafter, referred to as "gas separating module 10"), and the gas separating properties, that is, the hydrogen permeability and nitrogen permeability and hydrogen/nitrogen separating factor, of the gas separating module 10 were evaluated. First, the reformer 1 as shown in FIG. 2 was made. This reformer 1 generally includes a cylindrical chamber 2 made of stainless steel, a gas separating module 10 having a porous support (silicon nitride) 14 provided with the microporous ceramic film 12 derived from polysilazane as the main body, and a catalyst 18 to reform a variety of gases into hydrogen. The chamber 2 is provided with a gas supply tube 3 and a gas emission tube 4, separately. The chamber 2 is also provided a heater and an insulating member so that the temperature inside the chamber 2 can be controlled in the range of room temperature to 1200° C. The gas separating module 10 is placed in the chamber 2. A space portion 20 (which corresponds to a hydrogen forming portion in a reformer) around the module 10 can be filled with the catalyst 18 that can be various types. The evaluation test in this example was performed without filling the chamber 2 with the catalyst 18.

As shown in FIG. 2, one end of the gas separating module 10 was sealed with a metal cap 5 so that gas is prevented from entering a hollow portion 16 from that end. On the other end of the gas separating module 10, a joint tube 30 is attached. The open top portion (permeated gas outlet 6) of the joint tube 30 is exposed to the outside. Furthermore, a high temperature resistant sealing material (e.g., graphite) is inserted in an end portion (i.e., in the vicinity of the portion where the joint tube is attached) of the microporous ceramic layer (i.e., gas separating film) 12 on the outer circumferential surface of the gas separating module 10 for mechanical sealing. A gas chromatograph (not shown), is provided in a gas channel for gas emission connected to the permeated gas outlet 6 of the joint tube 30, so that the concentration of the gas flowing through it can be measured and the measured data can be analyzed by an automatic batch process with a computer system. The gas supply tube 3 of the chamber 2 is connected to a supply source of external gas, water vapor or the like, and gases for measurement, such as, hydrogen, nitrogen and water vapor can be supplied to the space portion 20 in the chamber through the gas supply tube 3. The gas in the space portion 20 is emitted to the outside through the gas emission tube 4.

With this system, the hydrogen permeability, nitrogen permeability and hydrogen/nitrogen separating factor of the gas separating module 10 were evaluated. That is to say, hydrogen and nitrogen were supplied to the chamber 2 from a hydrogen supply source and a nitrogen supply source (gas container) (not shown), at a predetermined flow rate. This supply was performed such that the differences in pressure between the inside and the outside of the gas separating membrane 12 was about $2 \times 10^4$ Pa (about 0.2 atm). This evaluation test was first performed at a room temperature of about 30° C., and then the temperature in the chamber 2 was increased to 50° C., 100° C., and 150° C. at a predetermine interval. The hydrogen separating properties at a high temperature of the gas separating module 10 of the reformer 1 of this example can be evaluated by performing tests continuously, while changing the temperature in this manner.

More specifically, hydrogen and nitrogen were supplied to the chamber 2 with the differential pressure generated as described above, while the heater is operated appropriately to control the temperature in the chamber 2 (room temperature to 150° C.). The flow rate measured on the permeation side (i.e., the channel for gas emission connected to the permeated gas outlet 6) was measured with a soap film flow meter (not shown). The gas permeation of each, hydrogen and nitrogen, was calculated based on the equation $Q=A/((Pr-Pp) \cdot S \cdot t)$, where Q is the gas permeation (mol/m$^2$·s·Pa), A is the amount of permeated gas (mol), Pr is the pressure (Pa) of the supply side, that is, the space portion 20 in the chamber 2, Pp is the pressure (Pa) of the permeation side, that is, the hollow portion 16 in the gas separating module 10, S is the cross-sectional area (m$^2$), and t is time (second). The hydrogen/nitrogen permeability coefficient ($H_2/N_2$ selectivity) can be calculated based on equation $\alpha = Q_{H2}/Q_{N2}$, where $\alpha$ is the hydrogen/nitrogen permeability coefficient (permeability ratio), $Q_{H2}$ is the hydrogen permeability and $Q_{N2}$ is nitrogen permeability.

Figure 3:
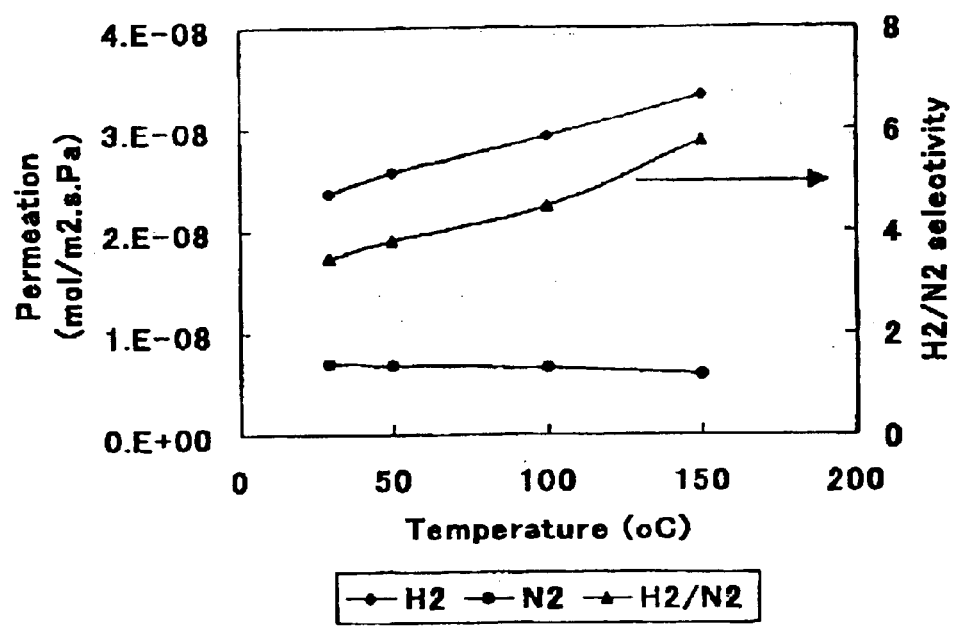
FIG. 3 is a graph showing the gas separation characteristics of a gas separating membrane (module) of one example.

FIG. 3 shows the hydrogen permeability (plotted with diamonds in the graph), the nitrogen permeability (plotted with circles in the graph) and the hydrogen/nitrogen permeability coefficient (plotted with triangles in the graph) measured at a room temperature(30° C.), 50° C., 100° C. and 150° C. As seen from this graph, the gas separating module 10 of this example has a hydrogen permeability higher than $2 \times 10^{-8}$ mol/m$^2$·s·Pa) in all the temperatures, and a hydrogen/nitrogen separating factor of 3.0 or more. Furthermore, in the gas separating module 10 of this example, the hydrogen permeability increases as the temperature increases. On the other hand, the nitrogen permeability slightly decreases. As a result, the hydrogen/nitrogen separating factor is as high as 5.0 or more (nearly 6) at a high temperature such as a temperature of more than 100° C. (e.g., 150° C.). This result indicates that the microporous ceramic materials (films) and the layered ceramic material of the present invention can have high hydrogen gas separating properties under conditions containing high temperatures such as 150° C. or more (i.e., 400° C. or more, or 600° C. more).

Specific examples of the present invention have been described above, but they are only illustrative and are not limiting to the scope of these claims. All changes and modifications from the specific examples illustrated above are intended to be embraced in the techniques disclosed in the appended claims.

The technical elements described in the specification or the drawings, can exhibit technical usefulness, either alone or in combination, and combinations are not limited to those described in the claims as filed. The techniques illustrated in the specification or the drawings can achieve a plurality of purposes at the same time, and achieving only one of them has technical usefulness.

What is claimed is:

1. A method for making a microporous ceramic material, comprising the steps of:
   (a) preparing a starting material for firing comprising a nonoxide ceramic precursor containing silicon as an essential component;
   (b) heating the starting material in an atmosphere containing at least 1 mol % of $H_2$, gas so as to form a microporous ceramic product; and
   (c) cooling the microporous ceramic product.

2. The method according to claim 1, wherein the starting material is heated to a maximum firing temperature at a heating rate of 10° C./min or less.

3. The method according to claim 2, wherein the maximum firing temperature is set in the range of about 400° C. to about 1000° C.

4. The method according to claim 3, wherein the starting material is stored at a temperature in the range of about 200° C. to about 400° C. for at least one hour before being heated to the maximum firing temperature.

5. The method according to claim 4, wherein the starting material is stored at a temperature in the range of about 200° C. to about 300° C. for 3 to 12 hours before being heated to the maximum firing temperature.

6. The method according to claim 1, wherein the microporous ceramic product is cooled from the maximum firing temperature to less than 100° C. at a cooling rate of about 20° C./min or less.

7. The method according to claim 6, wherein the cooling rate is set in the range of 1° C./min to 2° C./min.

8. The method according to claim 1, wherein the starting material is heated in an atmosphere containing 5 to 50 mol % of $H_2$ gas and 50 to 95 mol % of $N_2$ or inert gas.

9. The method according to claim 1, wherein the nonoxide ceramic precursor is a polysilazane.

10. The method according to claim 1 further comprising the step of coating a surface of a microporous ceramic support with the starting material.

* * * * *